(12) United States Patent
Sheriff

(10) Patent No.: US 9,392,775 B2
(45) Date of Patent: Jul. 19, 2016

(54) FISH CULTURING SYSTEM

(71) Applicant: Richard L. Sheriff, Big Pine Key, FL (US)

(72) Inventor: Richard L. Sheriff, Big Pine Key, FL (US)

( * ) Notice: Subject to any disclaimer, the term of this patent is extended or adjusted under 35 U.S.C. 154(b) by 274 days.

(21) Appl. No.: 14/289,623

(22) Filed: May 28, 2014

(65) Prior Publication Data
US 2015/0342161 A1 Dec. 3, 2015

(51) Int. Cl.
*A01K 61/00* (2006.01)
*A01K 63/04* (2006.01)

(52) U.S. Cl.
CPC ............ *A01K 63/045* (2013.01); *A01K 61/00* (2013.01); *A01K 63/04* (2013.01); *A01K 63/042* (2013.01)

(58) Field of Classification Search
CPC ..... A01K 61/00; A01K 63/00; A01K 63/003; A01K 63/04; A01K 63/042; A01K 63/045
See application file for complete search history.

(56) References Cited

U.S. PATENT DOCUMENTS

| | | | |
|---|---|---|---|
| 3,661,262 A | 5/1972 | Sanders | |
| 3,888,210 A | 6/1975 | Buss | |
| 4,030,450 A | 6/1977 | Hoult | |
| 4,043,299 A | 8/1977 | Birbeck et al. | |
| 4,211,183 A | 7/1980 | Hoult | |
| 4,221,187 A | 9/1980 | Casey | |
| 4,414,919 A | 11/1983 | Hess | |
| 4,427,548 A | 1/1984 | Quick, Jr. | |
| 4,806,237 A | 2/1989 | Ewald, Jr. | |
| 4,861,465 A | 8/1989 | Augustyniak | |
| 4,892,651 A | 1/1990 | Hill | |
| 4,951,606 A | 8/1990 | Hartung | |
| 5,158,037 A | 10/1992 | Engelbart | |
| 5,290,437 A | 3/1994 | Lin | |
| 5,438,959 A * | 8/1995 | Stone | A01K 63/042 119/248 |
| 5,450,818 A | 9/1995 | Caillouet | |
| 5,560,318 A | 10/1996 | Yoshida et al. | |
| 5,746,921 A | 5/1998 | Gargas et al. | |
| 6,065,430 A | 5/2000 | Sheriff | |

(Continued)

FOREIGN PATENT DOCUMENTS

| | | |
|---|---|---|
| CN | 101773091 A | 7/2010 |
| DE | 102007017447 A1 | 10/2008 |

OTHER PUBLICATIONS http://aquaculturetanks.net/, Opposing Flows Technology, 2014, pp. 1-11.

(Continued)

*Primary Examiner* — Kathleen Alker
(74) *Attorney, Agent, or Firm* — Richard C. Litman

(57) ABSTRACT

The fish culturing system includes a culture tank for raising fish, a multi-stage filter system to clean the water in the culture tank, and an air manifold supplying air to the whole system. A water return manifold substantially surrounds the upper portion of the culture tank and a waste output manifold substantially surrounds the lower portion of the culture tank. Water flowing through the water return manifold exits through a plurality of openings into the culture tank and an air diffuser assembly aerates and induces opposing flows in the water in the culture tank. Waste material in the culture tank is drawn through the waste output manifold and directed through the multi-stage filter system to remove solid waste and reduce toxic levels of ammonia. At least one clean-out port communicates with the water return manifold and the waste output manifold for respective cleaning. An adjustable overflow pipe regulates water levels.

16 Claims, 6 Drawing Sheets

(56) References Cited

U.S. PATENT DOCUMENTS

| | | | |
|---|---|---|---|
| 6,117,313 | A | 9/2000 | Goldman et al. |
| 7,144,501 | B2 * | 12/2006 | Beaulieu ................ A01K 63/04 210/167.01 |
| 7,381,326 | B2 | 6/2008 | Haddas |
| 7,934,706 | B2 * | 5/2011 | Mitchell ............... A01K 63/042 261/122.1 |
| 8,622,025 | B2 | 1/2014 | BÖer et al. |
| 8,677,942 | B2 | 3/2014 | Bodlovich et al. |
| 2004/0074834 | A1 * | 4/2004 | Beckman ............. A01K 63/045 210/323.1 |
| 2006/0191828 | A1 * | 8/2006 | Cummins .............. B01D 33/11 210/97 |
| 2011/0204003 | A1 * | 8/2011 | Kaczor ................ A01K 61/003 210/800 |
| 2011/0309034 | A1 * | 12/2011 | Yousfan ........... B01F 15/00389 210/758 |
| 2012/0172221 | A1 * | 7/2012 | Skitt ...................... A01K 63/04 504/150 |
| 2014/0116346 | A1 * | 5/2014 | Lutz .................... A01K 63/003 119/269 |

OTHER PUBLICATIONS

"Iowa's first bass farm," http://www.messengernews.net/page/content.detail/id/547275/Iowa-s-first-bass-farm.html?nav=5003, Apr. 14, 2006, pp. 1-3.

"Premier Organic Farms Awards Contract for Organic Tilapia Expansion Project," http://www.messengernews.net/page/content.detail/id/547275/Iowa-s-first-bass-farm.html?nav=5003, Aug. 14, 2006, pp. 1-2.

U.S. Appl. No. 14/290,885, Richard L. Sheriff, filed electronically on May 29, 2014.

Disclosure Statement re: Mar. 10, 2013 Contract for Aquaculture Systems, and Attachment A, 2 pages.

* cited by examiner

FISH CULTURING SYSTEM

BACKGROUND OF THE INVENTION

1. Field of the Invention

The present invention relates to aquaculture devices, and particularly to a fish culturing system utilizing air to aerate and circulate water and power the system, as well as maximize fish population density and aquaculture for a given space.

2. Description of the Related Art

As more and more people are consuming fish to achieve health benefits, demand for commercially raised fish has increased. To meet this demand, a fish culturing system that is inexpensive and efficient to use is needed. Additionally, it is beneficial to have such a system indoors, rather than exposed to the elements.

To meet this increased demand and minimize space needed for the operation, the number of fish grown in a certain volume of water must be maximized. In increasing the number of fish per certain volume, several concerns must be addressed. Increased fish population means increased demand for oxygen from the same volume of water. Aeration of the water helps increase levels of dissolved oxygen for use by fish, thereby allowing an increase in the fish population. Of course increased population means increased feeding and increased waste production. Excess food and waste in the water begin to break down producing ammonia, which is toxic to fish even at low levels of concentration. Frequent water changes help alleviate this problem, but are costly and wasteful of the natural resource. Reuse and recycling of the water is therefore not only desirable, but environmentally and economically mandated. Water in the tank contains toxic levels of ammonia and suspended solids from fish wastes and food residues. Thus, filters have been developed that remove suspended solids from the water by physical means, and convert deadly ammonia to harmless nitrate by biological filtration, before returning water back to the tank.

Such filtering systems generally pump water from a rearing tank through an area having increased surface area harboring bacteria which convert the deadly ammonia to harmless nitrate, while a filter bed traps suspended solids before returning the water to the tank.

An example of such a fish culturing system is disclosed in U.S. Pat. No. 6,065,430, hereinafter referred to as '430 patent, issued to Richard L. Sheriff on May 23, 2000. The fish culturing system therein uses pressurized or compressed air to facilitate all the pumping required to recirculate the water through a culture tank, where the fish being grown reside, and a separate purifying unit coupled to the culture tank to clean the water of waste material and ammonia. This can substantially reduce energy consumption and costs compared to the typical electric water pumps utilized in most conventional systems. In addition to the motive force for moving water, the air also provides all the aeration for the fish being grown and the nitrifying bacteria in the filter bed. Also, the fish culturing system in the '430 patent includes a central waste overflow manifold suspended along the length of the culture tank directing waste that can float near the surface of the water in the culture tank to the purifying unit.

However, with fish culturing systems, space can be a concern with respect to production and maximizing yield of the farm grown fish. For a given amount of space, a purifying unit of a fish culturing system can present a structure occupying space that can potentially be used for a larger culture tank. The purifying unit can also very labor intensive to maintain because the filters must be cleaned frequently.

Thus, it would be desirable to have a fish culture system that can draw waste from the culture tank, recycles and recirculates water, while aerating and nitrifying the water, efficiently and economically. Thus, a fish culturing system addressing the aforementioned problems is desired.

SUMMARY OF THE INVENTION

The fish culturing system includes a culture tank adapted to be filled with water for raising fish, a multi-stage filter system to clean the water, and an air manifold supplying air to the whole system. A water return manifold substantially surrounds the upper portion of the culture tank and a waste output manifold substantially surrounds the lower portion of the culture tank. Water flowing through the water return manifold exits through a plurality of openings into the culture tank and an air diffuser assembly aerates and induces opposing flows in the water in the culture tank. Waste material in the culture tank is drawn through the waste output manifold and directed through the multi-stage filter system to substantially remove solid waste and reduce toxic levels of ammonia. At least one clean-out port communicates with the water return manifold and the waste output manifold for respective cleaning. An adjustable overflow pipe regulates water levels.

These and other features of the present invention will become readily apparent upon further review of the following specification and drawings.

BRIEF DESCRIPTION OF THE DRAWINGS

Unless otherwise indicated, similar reference characters denote corresponding features consistently throughout the attached drawings.

DETAILED DESCRIPTION OF THE PREFERRED EMBODIMENTS

Figure 1A:
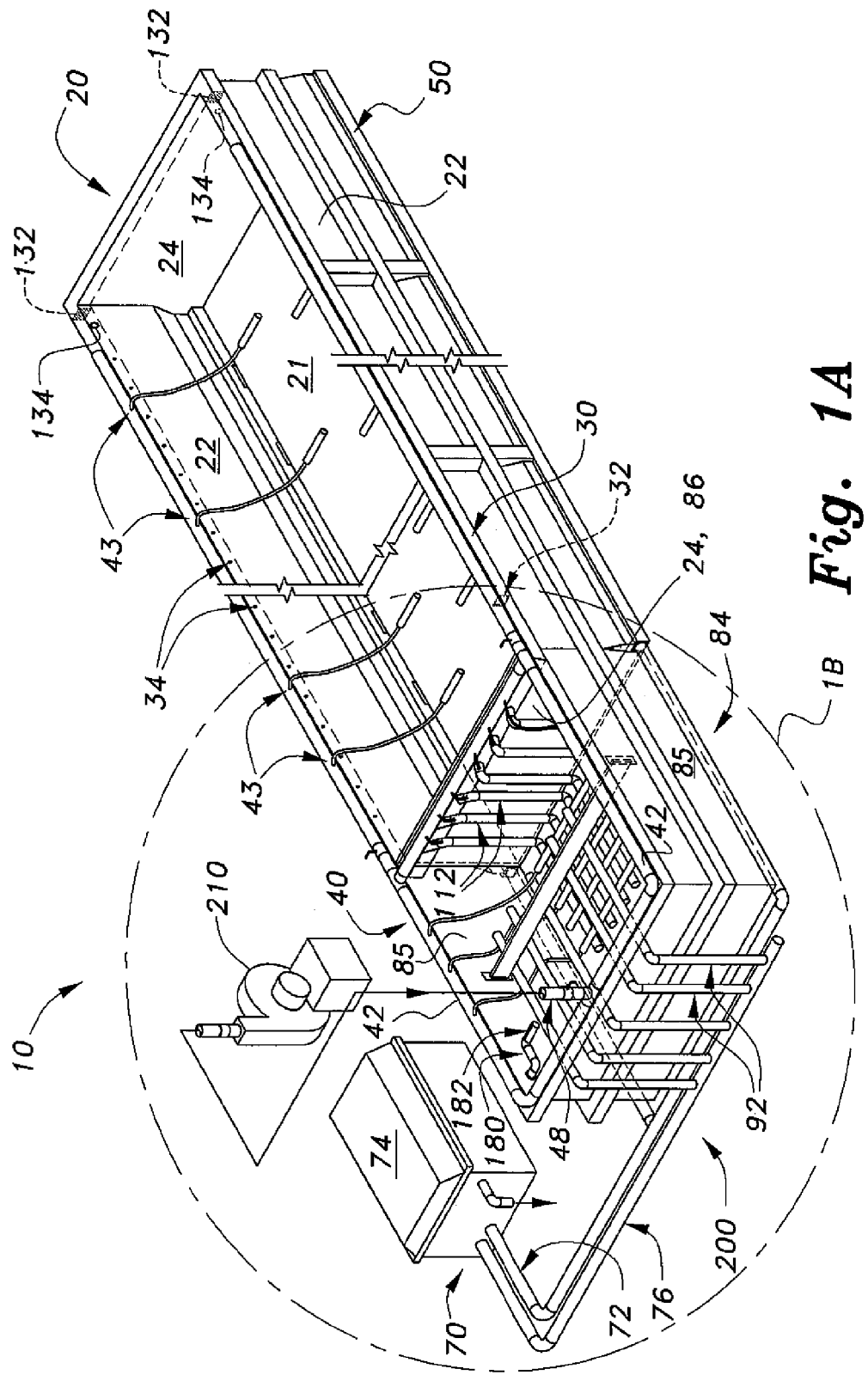
FIG. 1A is an environmental, perspective view of a fish culturing system according to the present invention with some of the air tubes in the second air uplift assembly removed for clarity.
Figure 1B:
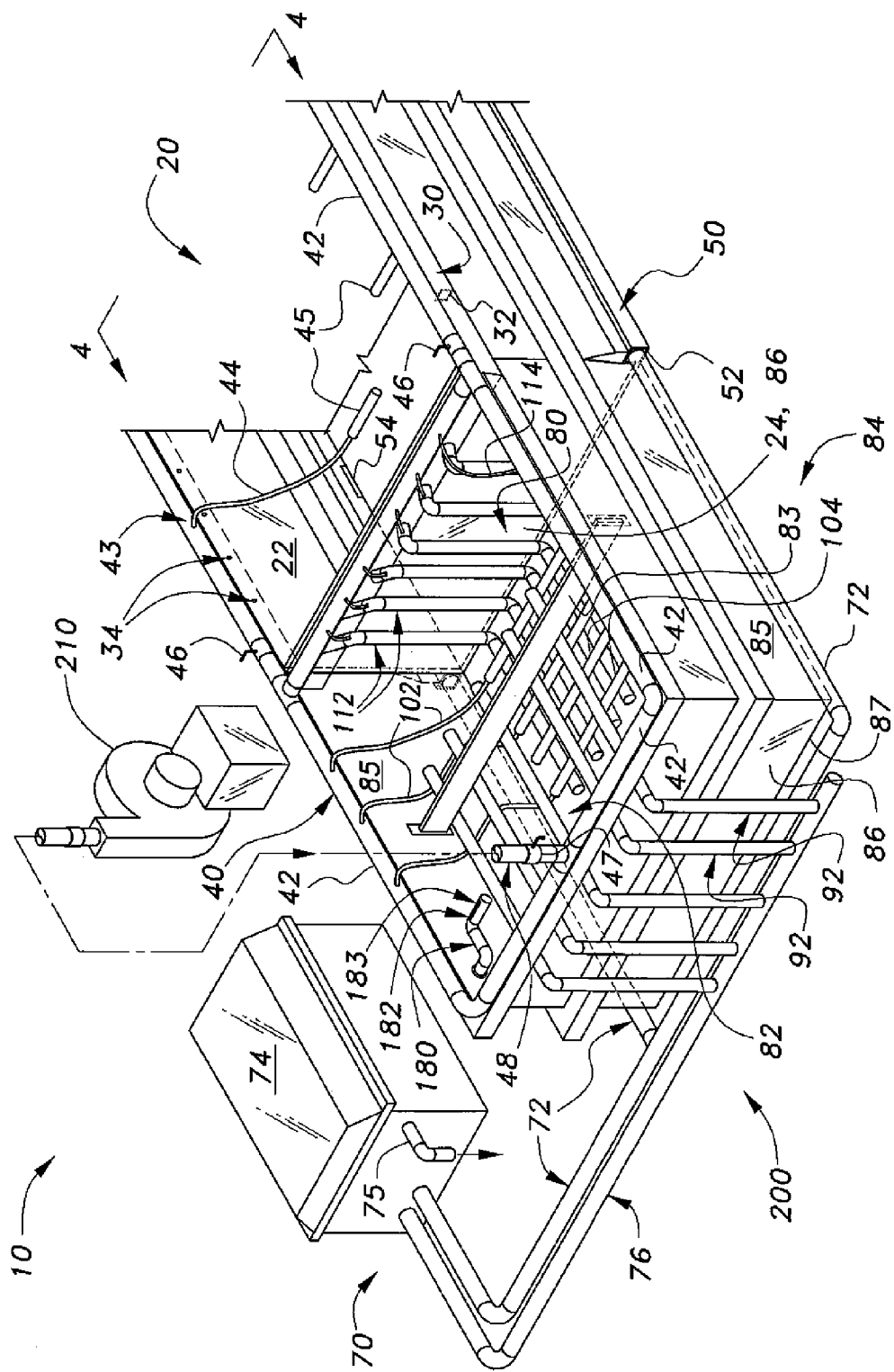
FIG. 1B is a detailed perspective view of a biofilter tank section of the fish culturing system shown in FIG. 1A with some of the air tubes in the second air uplift assembly removed for clarity.
Figure 2:
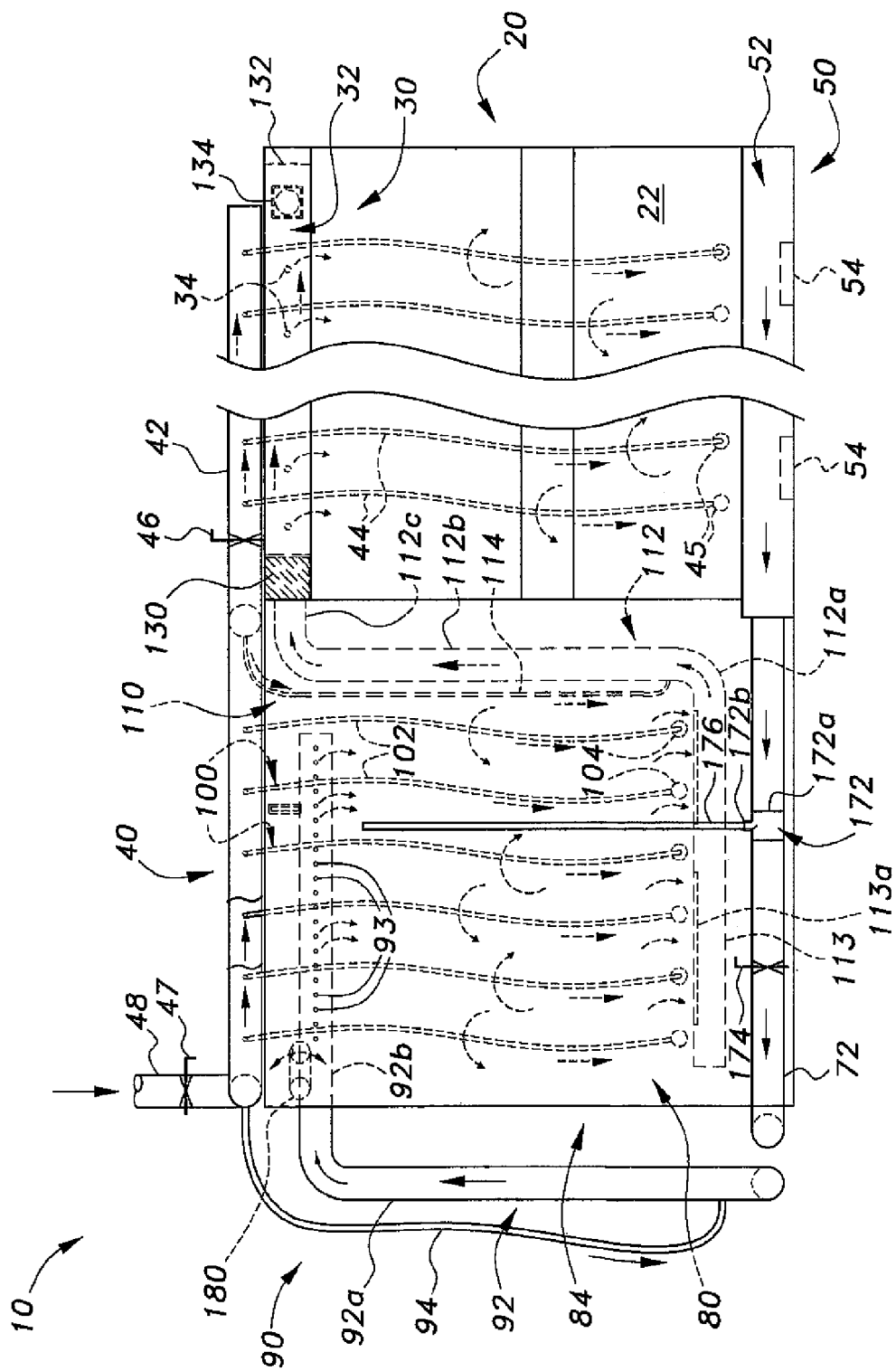
FIG. 2 is a schematic side view of the fish culturing system shown in FIG. 1A.
Figure 3:
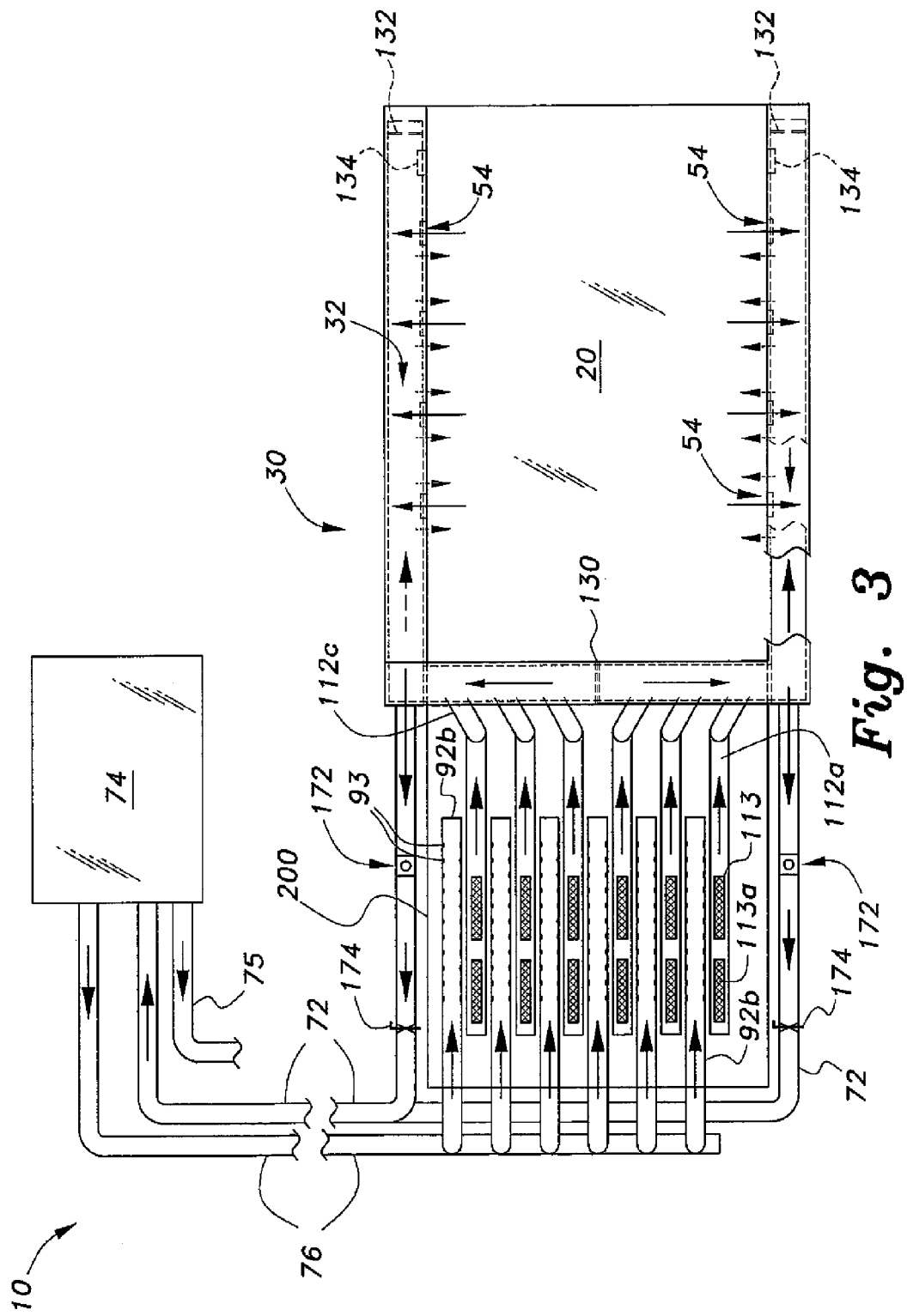
FIG. 3 is a schematic top view of the fish culturing system shown in FIG. 1A with the air manifold and air tubes removed for clarity.
Figure 4:
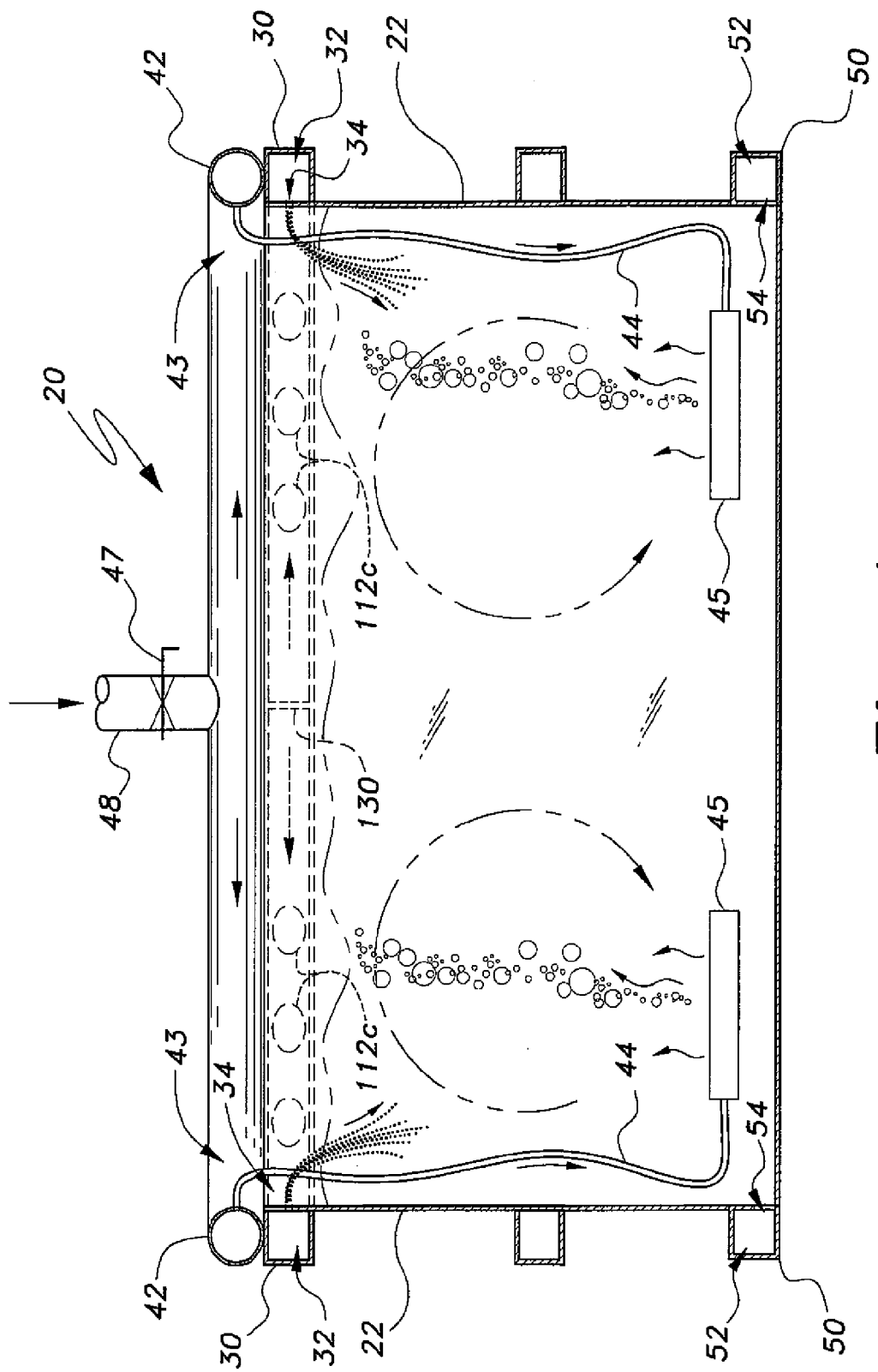
FIG. 4 is a schematic sectional view of the fish culturing system shown in FIG. 1A.

The fish culturing system, generally referred to by the reference number 10 in the drawings, provides labor saving features and increased production capacity in a more streamlined configuration. As shown in FIGS. 1A-5, the fish culturing system 10 includes a culture tank 20, a multi-stage filter system 200, and an air manifold 40 supplying air to the fish culturing system 10. The water typically undergoes various stages of cleaning, filtration, and movement as the water is cycled throughout the fish culturing system 10.

The culture tank 20 is configured to house and raise fish. The culture tank 20 includes at least a pair of opposed elongated sides or sidewalls 22 and at least a pair of opposed shorter sides or sidewalls 24 connected to the opposite ends of the elongated sidewalls 22. The four sidewalls are attached to a flat bottom 21, creating a reservoir for holding water and fish with an open top. This reservoir is shown fragmented in FIGS. 1A and 1B to indicate various sizes and volumes, as can depend on the particular use or application, for example.

Each elongated sidewall 22 has two manifolds, a water return manifold 30 and a waste output manifold 50. The water return manifold 30 runs along the upper exterior portion of each elongated sidewall 22 and at least one of the shorter sidewalls 24 forming a channel 32 for water to flow through. The portion of the water manifold 30 extending along one of the shorter sidewalls 24 is in direct communication with outlet pipes from the multi-stage filter system 200 forming a common channel between the culture tank 20 and the multi-stage filter system 200. The portions of the water return manifold 30 running along the length of the elongated sidewalls 22 are provided with a plurality slits, holes, perforations, or openings 34 that extend into the interior of the culture tank 20. These openings 34 permit the water flowing through the water return manifold 30 to be forcibly expelled towards the center of the culture tank 20, which during use, causes opposing flows due to expelling water streams from the opposite sides of the culture tank 20. These opposed flows agitate the water to improve oxygenation and push debris and wastes towards the outer edges of the bottom of the culture tank 20. Most floating debris will eventually flow towards the bottom and, as such, a substantial portion of the remainder of the debris can be periodically skimmed manually by the user or by a suitable automatic skimmer, for example.

An air manifold 40 is in fluid connection with a source of compressed air 210, such as a conventional air compressor or compressed air tank, for example. The air manifold 40 includes a plurality of pipes 42 mounted or suspended along the top periphery of the culture tank 20 and a biofilter tank 84 extending from the culture tank 20. The layout of the air pipes 42 desirably match the outline of the culture tank 20 and the biofilter tank 84 so as to be positioned for relatively easy use without being a substantial hindrance to the user during maintenance and general upkeep, for example.

The air manifold 40 includes an air diffuser assembly 43 extending into the interior of the culture tank 20. As best seen in FIGS. 1-4, the air diffuser assembly 43 includes a plurality of air tubes or hoses 44 spaced along the air pipes 42 positioned above the top lip or edge of the elongated sidewalls 22. Each air tube 44 is connected to the air manifold 40 at one end and a diffuser 45 is coupled to the other end of the air tube 44 near the bottom of the culture tank 20. The diffusers 45 inject air into the culture tank 20, aerating the water and creating a generally circular water flow by carrying water upwards. The air manifold 40 can also include a control valve 46 coupled to each air pipe 42 running along the length of the elongated sidewalls 22 to thereby control and/or adjust the amount of air being directed thereto. A shutoff valve 47 is coupled to an air inlet pipe 48 on the air manifold 40 to selectively control induction of air through the air manifold 40. The bottom or lower portion of each air tube 44 is desirably left freely hanging so as to ease maintenance by allowing the user to simply pull the air tube 44 out of the culture tank 20. This can provide a relatively easier means of accessing the air tube 44 and/or the diffuser 45 for maintenance purposes, such as compared to a secured bottom portion of the air tube 44, for example. The combination of the inherent stiffness of the tube 44 and the weight of the air diffuser 45 attached to the bottom end of the tube 44 is generally sufficient to maintain the disposition of the tubes 44 along the interior sides of the culture tank 20 notwithstanding the agitated water flows caused by the water streams and aeration.

To facilitate cleaning of the water in the fish culturing system 10, the fish culturing system 10 can include several stages of cleaning to recirculate and recycle the water. A first stage of cleaning includes a waste output manifold 50 disposed along the bottom exterior of each elongated sidewalls 22. Similar to the water return manifold 30, the waste output manifold 50 forms a channel 52 with a plurality of slots, holes, perforations or openings 54 extending into and in direct fluid communication with the interior bottom portion of the culture tank 20. The plurality of slots 54 draw waste materials and waste water to a waste inlet pipe 72 which connects the culture tank 20 to the input of a second stage of cleaning.

The second stage of cleaning includes a first filtering assembly 70 coupled to the waste output manifold 50. The first filtering assembly 70 is generally one of two filtering assemblies in the multi-stage filter system 200, but the number of filtering assemblies can depend on the particular use or application and should not be construed in a limiting sense. The first filtering assembly 70 includes the waste inlet pipe 72 directing the waste material and water from the waste output manifold 50 to a drum filter 74. The drum filter 74 separates solid waste material from the waste water through a rotary sieving process known in the art, which generally results in producing dirty water, i.e. a relatively small amount of water mixed with the solid waste material, and clean or clarified water. The drum filter 70 directs the dirty water to a drain 75 while the remaining clarified water passes to the outlet pipe 76. The outlet pipe 76 fluidly communicates with a third stage of cleaning. By this process, the first filtering assembly 70 removes solid waste material from the water so as to facilitate further cleaning for recycling the water back into the culture tank 20.

In use, the drum filter 74 can service more than one combination or unit of culture tank 20 and biofilter tank 84. Thus, a plurality of units of these two tanks can pass waste water through the drum filter 74 and be supplied with the clarified water, for example.

While the first filtering assembly 70 removes solid waste material, the clarified water can still contain potentially harmful concentrations of ammonia. To clean the clarified water further prior to being pumped back into the culture tank 20, the third and usually the final stage of cleaning includes a second filtering assembly 80 to facilitate removal of harmful chemicals in the water, such as ammonia, at least to a level relatively safe for reintroduction into the culture tank 20. The second filtering assembly 80 is the second of the filtering assemblies in the multi-stage filter system 200.

The second filtering assembly 80 includes a fluidized biofilter assembly 82 integrated with or associated with the culture tank 20. The fluidized biofilter assembly 82 includes the biofilter tank 84 extending from one end of the culture tank 20. The biofilter tank 84 is configured similar to the culture tank 20 in that the biofilter tank 84 is constructed as an open container or reservoir. At least a pair of opposing first sides or sidewalls 85, at least a pair of opposing second sides or sidewalls 86 connected to opposite ends of the first sides 85, and a bottom 87 form the biofilter tank 84. The culture tank 20 and the biofilter tank 84 together form a substantially elongate over-tank with two compartments where each compartment is defined by the respective tank. This construction can substantially reduce the footprint of the fish culturing system 10, for example. For example, an integrated construction of the fish culturing system 10 can result in about 18% reduction in footprint, which is relatively significant in maximizing space usage and fish population density. The biofilter tank 84 can be constructed as an extension of the culture tank 20 where one of the shorter sidewalls 24 forms a partition between the tanks eliminating where the sidewall 24 and the sidewall 86 form a common wall between the two tanks, or the biofilter tank 84 can be constructed as a separate structure secured to the culture tank 20 such as with fasteners, welds, and the like, for example, and should not be construed in a limiting sense.

The clarified water from the drum filter 74 flows into biofilter tank 84 via a first air uplift assembly 90. The first air uplift assembly 90 includes a plurality of inlet pipes 92 communicating at one end to the outlet pipe 76 and the other end of the inlet pipes 92 extending into the biofilter tank 84. Each inlet pipe 92 is desirably an elbow or L-shaped pipe having a first section 92a and a second section 92b extending perpendicularly from the first section 92a, the second section 92b passing through the sidewall 86 adjacent the inlet pipe 92.

To facilitate water flow through the inlet pipes 92, the first air uplift assembly 90 includes a plurality of air tubes or hoses 94 each extending from the air manifold 40 towards the bottom portion of a respective inlet pipe 92, i.e. the bottom portion of the first section 92a. The supplied air creates pressure and bubbles inside the inlet pipes 92 that aerates the clarified water, draws the same through the inlet pipe 92, and raises the clarified water in the inlet pipe 92 to force the clarified water out of the inlet pipes 92. A plurality of slots, holes, perforations, or openings 93 extend in a row on diametrically opposite sides of the second section 92b to facilitate forcible expelling of the clarified water into the biofilter tank 84. The distal end of the second section 92b is closed or capped to insure that the clarified water streams out of the holes 93. Moreover, the arrangement of the holes 93 and the resultant water streams therefrom assists in enabling relatively even dispersion, distribution, and flow of the clarified water. Such relatively even or uniform water flow assists in maintaining desirable conditions in the fluidized biofilter process to support the biofilter media and bacteria living and growing thereon. The biofilter tank 84 can be provided with a support beam or bar 83 spanning the width of the biofilter tank 84 to support the distal ends of the second sections 92b when additional support can be required to maintain a relatively level extension of the second sections 92b within the biofilter tank 84, for example.

The clarified water contained inside the biofilter tank 84 undergoes a biofilter process to remove harmful concentrations of ammonia, and this process is facilitated by the bacteria growing and living on the surfaces of the biofilter media in the biofilter tank 84. To support and promote the growth of such bacteria, the environment needs to have sufficient oxygen with sufficient movement of the biofilter media to maximize exposure. The fluidized biofilter assembly 82 includes an air diffuser assembly 100 to aerate and agitate the clarified water thereby providing the clarified water with oxygen and current flow.

The air diffuser assembly 100 includes a plurality of air tubes or hoses 102 directly connected to the air manifold 40 and extending down towards the bottom of the biofilter tank 84. Just as with the air diffuser assembly 43, an elongated diffuser 104 is coupled to the distal end of each air tube 102 in a freely hanging or suspended manner. The elongated diffuser 104 is desirably long enough to span a substantial width of the biofilter tank 84 to enhance maximizing distribution of air bubbles therein. In an embodiment, an equal number of air tubes 102 hang from opposing interior sides of the sidewalls 85, but in a staggered arrangement. Consequently, the elongated diffusers 104 extend in opposite directions in staggered rows. This configuration assists in providing a substantial even distribution of air bubbles and, in combination with the clarified water streaming from the inlet pipes 92, assists in inducing opposing current flows that maintain fluidized activity or movement of the biofilter media.

Figure 5:
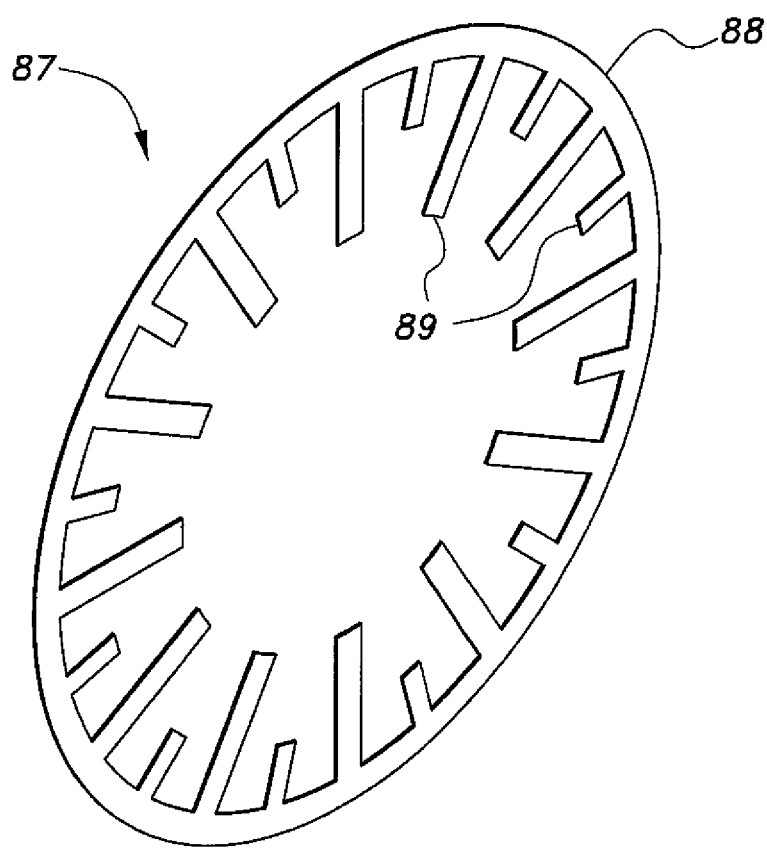
FIG. 5 is a perspective of a biofilter media used in the fish culturing system shown in FIG. 1A.

An example of a biofilter media 87 for use in the biofilter tank 84 is shown in FIG. 5. Each biofilter media 87 is constructed as a relatively thin, plastic annular ring 88 with a plurality of protrusions or spokes 89 radiating inwardly from the inner diameter thereof. The spokes 89 can be of varying lengths as shown or of uniform length, for example. The spokes 89 desirably do not reach the center, nor do they extend all the way to the diametrically opposite side. This type of construction provides a relatively large surface area in numbers of individual biofilter media 87 with abundant space for water to circulate around and through the annular ring 88. In use, typically over a million of these individual biofilter media 87 reside inside the biofilter tank 84, but the number of biofilter media 87 can vary depending on the use or application, for example. A relatively large quantity of biofilter media 87 provides a substantially large surface area to promote bacterial growth thereon.

The fluidized biofilter assembly 82 includes a second air uplift assembly 110 to transfer the filtered water from the biofilter tank 84 into the water return manifold 30 and thereby back into the culture tank 20. The second air uplift assembly 110 includes a plurality of outlet pipes 112 extending from the interior of the biofilter tank 84 into the water return manifold 30. Each outlet pipe 112 has a first section 112a configured to lie on the bottom of the biofilter tank 84, a vertical second section 112b extending perpendicularly or substantially perpendicularly from the first section 112a along the opposite sidewall 86, and a third section 112c extending perpendicularly or substantially perpendicularly from second section 112b but at an angle with respect to the vertical second section 112b. Each first section 112a desirably spans a substantial length of the biofilter tank 84 and includes at least one elongate slot 113 on top of each first section 112a. A screen 113a covers the respective elongate slot 113. The filtered water is drawn through elongate slots 113, and the screens 113a substantially prevent any of the biofilter media from being drawn through the elongate slots 113. The elongated diffusers 104 are desirably disposed across the first sections 112a so that the elongated diffusers 104 lie on or above the first sections 112a. This also assists in preventing the biofilter media from being drawn through the slots 113. The proximal end or the end of the first section 112a opposite the end connected to the second section 112b is desirably capped so that the drawing of the filtered water is limited to the elongate slots 113, for example. Also, this proximal end of the first section 112a can be left open but covered with a corresponding screen.

The second air uplift assembly 110 includes a plurality of air tubes or hoses 114 each extending from the air manifold 40 towards the bottom portion of a respective outlet pipe 112, i.e. the bottom portion of the second section 112b. The supplied air creates pressure and bubbles inside the outlet pipes 112 that aerates the filtered water, draws the same through the outlet pipe 112, and raises the filtered water to force the filtered water out of the outlet pipes 112. In an embodiment, the plurality of third sections 112c extending into the water return manifold 30 are desirably divided into two sets, and the angular disposition of each set is divergent and mirror opposite, for example. This can be a more efficient arrangement for directing the filtered water substantially equally to each side of the water return manifold 30 extending along the length of the culture tank 20.

Thus, it can be seen that fish culturing system 10 provides a relatively high amount of oxygenation at various stages of water circulation. As the filtered water streams into culture tank 20, the air diffuser assembly 43 aerates the water in the culture tank 20. The first air uplift assembly 90 and the second air uplift assembly 110 aerate the water as the water flows through the multi-stage filter system 200. The water is also aerated by the air diffuser assembly 100 when subjected to the biofilter process in the fluidized biofilter assembly 82. In addition to the relatively constant movement provided by the fish culturing system 10, the relatively large surface area of the biofilter media more efficiently removes the ammonia which assists in increasing the potential capacity of the fish culturing system 10. For example, embodiments of the fish culturing system 10 can increase the capacity from about 0.5 lbs. of fish/gallon to about 0.75 lbs. of fish/gallon, which is about a 50% increase in capacity.

The fish culturing system 10 also includes various features to assist in cleaning the system and controlling the water level in the fish culturing system 10. With respect to cleaning, the fish culturing system 10 can be subject to clogging in the water return manifold 30 and the waste output manifold 50. To facilitate unclogging, loosening of clogging material, or more aggressive cleaning of the water return manifold 30, the water return manifold 30 includes an interior first baffle 130, interior second baffles 132, and covered clean-out access ports 134. The clean-out access ports 134 are desirably disposed on the elongated sidewalls 22 on the same side as the openings 34 but near the distal end of the culture tank 20 from the biofilter tank 84. The clean-out access ports 134 can be selectively uncovered to provide access for cleaning implements, such as a high pressure hose to spray the channel 32. The first baffle 130 separates the water return manifold 30 into two separate flow paths, and second baffles 132 block the distal ends of the water return manifold 30 preventing water from escaping from those ends. Both the first baffle 130 and the second baffles 132 assist in confining the water flow to be within the channel 32 between these baffles. Moreover, the first baffle 130 insures that the incoming filtered water from the outlet pipes 112 will be directed to the two flow paths so that water flow is distributed relatively evenly between the two paths.

To facilitate unclogging, loosening of clogging material, or a more aggressive cleaning of the waste output manifold 50, the waste inlet pipe 72 can include a clean-out T-fitting 172 disposed along the length of the waste inlet pipe 72. The clean-out T-fitting 172 includes a horizontal section 172a to enable coupling the same onto an interrupted or discontinuous section of the waste inlet pipe 72, and a clean-out port 172b extending radially from the horizontal section 172a. The clean-out port 172b is usually capped or covered during normal operation. When unclogging is needed, the clean-out port 172b is uncapped to provide access for cleaning implements, such as a high pressure hose so that the spray can be directed upstream. Loosened clogging material would then be expelled through the holes 54 in the waste output manifold 50 back into the culture tank 20. The clean-out port 172b is desirably curved to better direct the spray upstream.

The waste inlet pipe 72 can be provided with a shut off valve 174 downstream of the clean-out T-fitting 172 to selectively close the downstream pathway during cleaning. The clean-out T-fitting 172 can also be provided with an elongated extension pipe 176 to elevate the point of access for cleaning implements, such as the high pressure hose.

Also, the fish culturing system 10 can occupy a relatively large area of floor space in an aquaculture warehouse or farm. Such buildings do not always have a level floor, and the unevenness can be relatively pronounced for equipment of this scale. The effects of the uneven floor level can cause a corresponding change in the level of the water in the culture tank 20 and the biofilter tank 84. To address such unevenness, the fish culturing system 10 can include a variable overflow pipe 180.

The variable overflow pipe 180 is preferably an S-shaped, Z-shaped, or crank-shaped pipe rotatably mounted to the interior of one of the sidewalls 85 in the biofilter tank 84. As can be seen from the description above, the filtered water from the biofilter tank 84 serves as the water source for the culture tank 20. Thus, any water level changes in the biofilter tank 84 can cause a corresponding change in the level of the water in the culture tank 20. The mounted end of the variable overflow pipe 180 leads to a drain. An elongated slot 182 is formed near the opposite end of the variable overflow pipe 180, the elongated slot 182 functioning as a port for water to drain through. The elongated slot 182 is desirably covered by a screen 183 to substantially prevent the biofilter media 87 from being drawn to the drain.

In use, the user can rotate the variable overflow pipe 180 to a desired rotated position where the elongated slot 182 is disposed at the desired level compensating for the unevenness of the floor as can cause unevenness in water levels. In this regard, the variable overflow pipe 180 can selectively adjust a water level to compensate for an uneven water level in the fish culturing system 10, such as caused by unevenness of the floor. For example, if the water level is higher than desired for optimum operation, the variable overflow pipe 180 can be rotated so that the elongated slot 182 is submerged to the desired level. As a result, the excess water drains through the slot 182 until the water level has been stabilized. If the water level needs to be higher, then the variable overflow pipe 180 can be rotated till the elongated slot 182 is disposed at the desired higher level. More water can be introduced into the biofilter tank 84 until the desired higher level is reached and the excess drained through the elongated slot 182.

It is to be understood that the present invention is not limited to the embodiments described above, but encompasses any and all embodiments within the scope of the following claims.

I claim:

1. A fish culturing system, comprising:
   an elongated culture tank having a pair of spaced, elongated sidewalls, a pair of short sidewalls connected to opposing ends of the elongated sidewalls, and a bottom;
   a water return manifold extending along an upper portion of each of the elongated sidewalls and an upper portion of at least one of the short sidewalls, the water return manifold having a channel to facilitate water flow therein, and a plurality of openings formed along at least a portion of the water return manifold extending along the corresponding elongated sidewall, each opening communicating with an interior of the culture tank, the water return manifold having a plurality of internal baffles installed at select positions along the water return manifold to define water flow paths;
   a waste output manifold extending along a lower portion of each of the elongated sidewalls, the waste output manifold having a channel to facilitate flow of waste water therethrough, and a plurality of openings formed along at least a portion of the waste output manifold extending along the corresponding elongated sidewall, each opening communicating with the interior of the culture tank along the bottom thereof;
   a multi-stage filter system, the multi-stage filter system having a biofilter tank, the multi-stage filter system adapted to clean and filter the waste water to remove solid wastes and harmful levels of chemicals, the multi-stage filter system adapted to feed filtered water into the culture tank through the water return manifold, wherein the multi-stage filter system includes a first filtering assembly for removing solid wastes and a second fluidized biofilter assembly for removing potentially harmful levels of ammonia, wherein the first filtering assembly comprises:
   i) a drum filter operatively coupled to the waste output manifold and the biofilter tank;
   ii) an inlet pipe extending from the drum filter to the waste output manifold, the inlet pipe facilitating flow of waste water into the drum filter;
   iii) a drain pipe extending from the drum filter to a drain to remove filtered solid waste material; and
   iv) an outlet pipe extending from the drum filter to the biofilter tank, the outlet pipe facilitating flow of clarified water from the drum filter to the biofilter tank;
wherein the second fluidized biofilter assembly comprises:
   the biofilter tank integral with the culture tank;
   a first air uplift assembly coupled to the outlet pipe from the drum filter and extending into the biofilter tank, the first air uplift assembly drawing clarified water from the outlet pipe and into the biofilter tank;
   a plurality of biofilter media disposed inside the biofilter tank, the plurality of biofilter media having a relatively large combined surface area for bacteria to reside and grow, the bacteria processing the clarified water to remove ammonia;
   an air diffuser assembly extending from the air pipes into the biofilter tank, the air diffuser assembly to aerate and lift the clarified water to induce opposing current flows in the water in the biofilter tank; and
   a second air uplift assembly extending from a bottom of the biofilter tank and into the water return manifold, the second air uplift assembly drawing filtered water in the biofilter tank and transferring the filtered water to the water return manifold to be dispensed back into the culture tank;
   an air manifold associated with the culture tank and the biofilter tank, the air manifold having an inlet adapted to be coupled to a source of compressed air, a plurality of air pipes adapted to supply air to the fish culturing system, and a plurality of air tubes extending at least into the culture tank and the biofilter tank to aerate and lift the water contained in the culture tank and the biofilter tank to oxygenate the water, induce opposing current flows in the water and facilitate transfer of water in the fish culturing system;
   at least one first clean-out access port coupled to the water return manifold, the at least one first clean-out access port providing selective access for a cleaning implement to remove clogging material;
   at least one second clean-out access port coupled to the multi-stage filter system, the at least one second clean-out access port providing selective access for a cleaning implement to remove clogging material in the waste output manifold; and
   a variable overflow pipe having one end mounted to an interior of the biofilter tank, the variable overflow pipe being selectively moveable to raise or lower an opposite end of the variable overflow pipe to drain water from the fish culturing system to compensate for an uneven water level in the fish culturing system, the variable overflow pipe having at least one opening to drain the water therethrough.

2. The fish culturing system according to claim 1, wherein the air manifold comprises the air pipes extending along a top periphery of the culture tank, wherein the air pipes each include a respective air diffuser assembly coupled thereto.

3. The fish culturing system according to claim 2, wherein the air diffuser assembly comprises the plurality of air tubes extending into the culture tank from each interior side of the elongated sidewall, each air tube having one end coupled to the respective air pipe and an elongated diffuser coupled to the opposite end of the air tube.

4. The fish culturing system according to claim 1, wherein the first air uplift assembly comprises:
   a plurality of inlet pipes, each inlet pipe communicating at one end to the outlet pipe from the drum filter and the other end extending into the biofilter tank, each inlet pipe having a first section connected to the outlet pipe from the drum filter and a second section extending substantially perpendicularly from the first section, the second section passing through a sidewall of the biofilter tank, the second section having a plurality of openings on diametrically opposed sides of the second section; and
   a plurality of second air tubes each extending from the air manifold towards a bottom portion of a respective first section of the inlet pipe, each second air tube to supply air to the respective inlet pipe to create pressure and bubbles inside the inlet pipe to aerate the clarified water, draw the clarified water through the inlet pipe, and raise the clarified water to force the clarified water out through the openings in the respective second section of the inlet pipe.

5. The fish culturing system according to claim 1, wherein the air diffuser assembly comprises:
   the plurality of air tubes extending from the air manifold towards the bottom of the biofilter tank at opposing sides of the biofilter tank, wherein each air tube includes a proximal end coupled to a respective air pipe and a distal end; and
   an elongated diffuser coupled to the distal end of each air tube, the elongated diffuser aerating and agitating the clarified water to create opposing current flows in the water to maintain fluidized activity for the bacteria to thrive.

6. The fish culturing system according to claim 1, wherein the second air uplift assembly comprises:
   a plurality of outlet pipes, each outlet pipe communicating at one end with filtered water in the biofilter tank and the other end communicating with the water return manifold, each pipe having a first section configured to lie on the bottom of the biofilter tank, a vertical second section extending substantially perpendicularly from the first section, and a third section extending substantially perpendicularly from the vertical second section at an angle relative to the second section into the water return manifold, the plurality of outlet pipes being divided into two sets so as to have the angular disposition of the third section in each set be positioned at a divergent angle from the other set to direct filtered water in divergent paths, each first section having at least one slot and a screen covering the at least one slot, each slot facilitating thawing of the filtered water through the outlet pipe and the screen preventing the biofilter media from entering the outlet pipes; and
   a plurality of third air tubes each extending from the air manifold towards a bottom portion of a respective second section of the outlet pipe, each third air tube supplying air to the respective outlet pipe to create pressure and bubbles inside the outlet pipe that aerate the filtered water, draw the filtered water through the outlet pipe, and raise the filtered water to force the filtered water out into the water return manifold and be dispensed into the culture tank.

7. The fish culturing system according to claim 6, wherein the plurality of internal baffles comprises:
 a first internal baffle disposed in a section of the water return manifold extending along the upper portion of one of the short sidewalls; and
 a plurality of second internal baffles each disposed in a section of the water return manifold extending along an upper portion of each elongated sidewall, the first internal baffle and the plurality of second internal baffles defining water flow paths inside the water return manifold.

8. A fish culturing system, comprising:
 an elongated culture tank for housing and culturing fish;
 a water return manifold extending along an upper portion of the elongated culture tank, the water return manifold having opposed elongated portions, the water return manifold having a channel to facilitate water flow therein, and a plurality of openings formed along each elongated portion of the water return manifold, each opening communicating with an interior of the culture tank;
 a waste output manifold extending along a lower portion of the elongated culture tank, the waste output manifold having a channel to facilitate flow of waste water therethrough, and a plurality of openings faulted along the waste output manifold, each opening communicating with the interior of the culture tank along the bottom thereof;
 a multi-stage filter system associated with the culture tank, the multi-stage filter system having a biofilter tank, the multi-stage filter system adapted to clean and filter the waste water to remove solid wastes and harmful levels of ammonia, the multi-stage filter system feeding filtered water into the culture tank through the water return manifold, wherein the multi-stage filter system includes a first filtering assembly for removing solid wastes and a second fluidized biofilter assembly for removing potentially harmful levels of ammonia;
 wherein the first filtering assembly comprises:
  i) a drum filter operatively coupled to the waste output manifold and the biofilter tank; and
  ii) an outlet pipe extending from the drum filter to the biofilter tank, the outlet pipe facilitating flow of clarified water from the drum filter to the biofilter tank;
 wherein the second fluidized biofilter assembly comprises:
  the biofilter tank integral with the culture tank;
  a first air uplift assembly coupled to the outlet pipe from the drum filter and extending into the biofilter tank, the first air uplift assembly drawing clarified water from the outlet pipe and into the biofilter tank;
  a plurality of biofilter media disposed inside the biofilter tank, the plurality of biofilter media having a relatively large combined surface area for bacteria to reside and grow, the bacteria processing the clarified water to remove ammonia;
  an air diffuser assembly extending from the air pipes into the biofilter tank, the air diffuser assembly to aerate and lift the clarified water to induce opposing current flows in the water in the biofilter tank; and
  a second air uplift assembly extending from a bottom of the biofilter tank and into the water return manifold, the second air uplift assembly drawing filtered water in the biofilter tank and transferring the filtered water to the water return manifold to be dispensed back into the culture tank;
 an air manifold disposed above the culture tank and the biofilter tank, the air manifold having an inlet adapted to be coupled to a source of compressed air, a plurality of air pipes supplying air to the fish culturing system, and a plurality of air tubes extending at least into the culture tank and the biofilter tank to aerate and lift the water contained in the culture tank and the biofilter tank to oxygenate the water, induce opposing current flows in the water and facilitate transfer of water in the fish culturing system; and
 at least one clean-out access port coupled to at least one of the water return manifold and waste output manifold, the at least one clean-out access port providing selective access for a cleaning implement to remove clogging material.

9. The fish culturing system according to claim 8, wherein the at least one clean-out access port comprises at least one first access port coupled to the water return manifold, and
 the water return manifold has a plurality of internal baffles installed at select positions along the water return manifold to define water flow paths.

10. The fish culturing system according to claim 9, wherein the at least one clean-out access port further comprises at least one second access port coupled to the multi-stage filter system, the at least one second clean-out access port providing selective access for a cleaning implement to remove clogging material in the waste output manifold.

11. The fish culturing system according the claim 8, further comprising:
 a variable overflow pipe having one end rotatably mounted to an interior of the biofilter tank, the variable overflow pipe having a slot near the opposite end, a screen covering the slot, the one end adapted to lead to a drain, the variable overflow pipe being selectively rotatable to raise or lower the slot to drain water from the fish culturing system to compensate for an uneven water level in the fish culturing system, the slot facilitating drawing of excess water to the drain to maintain a desired water level.

12. A fish culturing system, comprising:
 an elongated culture tank having a pair of spaced, elongated sidewalls, a pair of short sidewalls connected to opposing ends of the elongated sidewalls, and a bottom;
 a water return manifold extending along an upper portion of each of the elongated sidewalls and an upper portion of one of the short sidewalls, the water return manifold having a channel to facilitate water flow therein, and a plurality of openings formed along at least a portion of the water return manifold extending along the corresponding elongated sidewall, each opening communicating with an interior of the culture tank;
 a waste output manifold extending along a lower portion of each of the elongated sidewalls, the waste output manifold having a channel to facilitate flow of waste water therethrough, and a plurality of openings, each opening communicating with the interior of the culture tank along the bottom thereof;
 a multi-stage filter system associated with the culture tank, the multi-stage filter system having a biofilter tank, the multi-stage filter system adapted to clean and filter the waste water to remove solid wastes and potentially harmful levels of ammonia, the multi-stage filter system adapted to feed filtered water into the culture tank through the water return manifold, wherein the multi-stage filter system includes a first filtering assembly for removing solid wastes and a second fluidized biofilter assembly for removing potentially harmful levels of ammonia;

wherein the first filtering assembly comprises:
   i) a drum filter operatively coupled to the waste output manifold and the biofilter tank; and
   ii) an outlet pipe extending from the drum filter to the biofilter tank, the outlet pipe facilitating flow of clarified water from the drum filter to the biofilter tank;

wherein the second fluidized biofilter assembly comprises:
   the biofilter tank integral with the culture tank;
   a first air uplift assembly coupled to the outlet pipe from the drum filter and extending into the biofilter tank, the first air uplift assembly drawing clarified water from the outlet pipe and into the biofilter tank;
   a plurality of biofilter media disposed inside the biofilter tank, the plurality of biofilter media having a relatively large combined surface area for bacteria to reside and grow, the bacteria processing the clarified water to remove ammonia;
   an air diffuser assembly extending from the air pipes into the biofilter tank, the air diffuser assembly to aerate and lift the clarified water to induce opposing current flows in the water in the biofilter tank; and
   a second air uplift assembly extending from a bottom of the biofilter tank and into the water return manifold, the second air uplift assembly drawing filtered water in the biofilter tank and transferring the filtered water to the water return manifold to be dispensed back into the culture tank; and
   an air manifold disposed above the culture tank and the biofilter tank, the air manifold having an inlet adapted to be coupled to a source of compressed air, a plurality of air pipes supplying air to the fish culturing system, and a plurality of air tubes extending at least into the culture tank and the biofilter tank to aerate and lift the water contained in the culture tank and the biofilter tank to oxygenate the water, induce opposing current flows, and facilitate transfer of water in the fish culturing system.

13. The fish culturing system according to claim 12, further comprising:
   a variable overflow pipe having one end rotatably mounted to an interior of the biofilter tank, the variable overflow pipe having a slot near the opposite end, a screen covering the slot, the one end adapted to lead to a drain, the variable overflow pipe being selectively rotatable to raise or lower the slot to a desired water level, the slot facilitating drawing of excess water to the drain to maintain the desired water level.

14. The fish culturing system according to claim 12, further comprising:
   at least one clean-out access port coupled to at least one of the water return manifold and waste output manifold, the at least one clean-out access port providing selective access for a high pressure hose to flush out clogging material.

15. The fish culturing system according to claim 14, wherein
   the at least one clean-out access port comprises at least one first access port coupled to the water return manifold, and
   the water return manifold has a plurality of internal baffles installed at select positions along the water return manifold to define water flow paths.

16. The fish culturing system according to claim 15, wherein the at least one clean-out access port further comprises at least one second clean-out access port coupled to the multi-stage filter system, the at least one second clean-out access port providing selective access for a high pressure hose to flush out clogging material in the waste output manifold.

* * * * *